July 22, 1958     H. W. KRUSE     2,843,967
FISHING FLOAT
Filed March 21, 1955
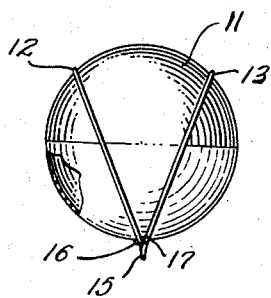
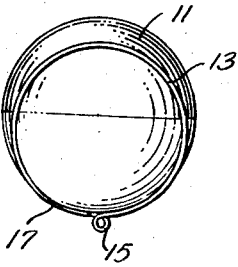
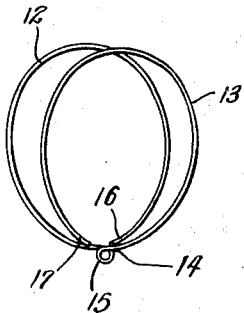
Fig. 1     Fig. 2     Fig. 3
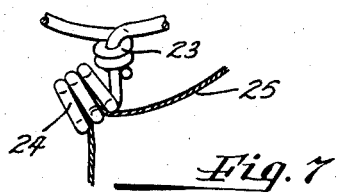
Fig. 7
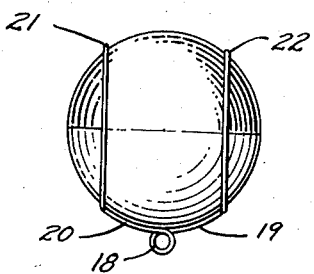
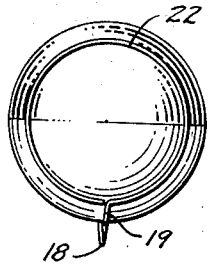
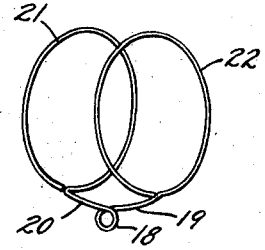
Fig. 4     Fig. 5     Fig. 6
Inventor
Hugo W. Kruse
By McCanna and Morsbach
Attys.

United States Patent Office 2,843,967
Patented July 22, 1958

2,843,967
FISHING FLOAT

Hugo W. Kruse, Rockford, Ill., assignor of one-half to Edward A. Morsbach, Rockford, Ill.

Application March 21, 1955, Serial No. 495,737

6 Claims. (Cl. 43—44.95)

This invention relates to fishing floats and has for its primary object the provision of a novel float construction of greater buoyancy and versatility and which is simple in construction and cheap to manufacture.

Other objects and advantages will be apparent from the following description and the accompanying drawing, in which—

Figure 1 is an elevational view showing the improved float construction;

Fig. 2 is an elevational view taken at 90° with respect to Figure 1;

Fig. 3 is an elevational view of the frame structure;

Figs. 4, 5 and 6 are views similar to Figs. 1 to 3 showing a modified frame structure, and Fig. 7 is a fragmentary view showing a modified form of line retaining means.

In each of the embodiments the buoyant element comprises a sphere or ball indicated at 11 formed of thin stiff sheet material impervious to water, the shell being imperforate. In the preferred form of the invention the ball comprises an ordinary table tennis ball in which the shell is of plastic material such as celluloid of thin cross-section. The inside of the ball may be filled with a light gas such as hydrogen to increase its buoyancy. Also in the preferred embodiment the surface of the ball has two colors, commonly red and white, one hemisphere of the ball being red, and the other hemisphere white.

The ball is retained in a light frame preferably in a removable fashion so that in the case of breakage the ball may be easily replaced.

In the form shown in Figs. 1 through 3 the frame comprises two loops 12 and 13 formed of light weight spring wire, the two loops normally converging adjacent a point indicated at 14. While this can be done in a number of different ways, in this embodiment the wire has a small eyelet 15 substantially midway between its ends arranged for the reception of the fish line for attachment of the float thereto. The two loops digress outwardly from the eyelet 15 and return so that the free ends of the loops indicated at 16 and 17 rest adjacent the eyelet 15.

It will be seen that with this construction the ball may be forced in between the loops 12 and 13 spreading these loops against the spring tension, the ball snapping in so that a segment thereof extends through each of the loops as will be apparent from Figure 1. In this manner the ball is securely held against displacement from the frame and loss from the fish line, but may be removed from the frame as desired. Likewise it will be seen that the ball may be rotated within the frame so as to bring either of the colored segments uppermost as the float rests on the surface of the water.

In Figs. 4 through 6 there is shown a modification of the frame construction which likewise includes an eyelet 18 for attachment of the float to a fish line, the wire of the frame extending from the eyelet 18 outwardly in two segments as shown at 19 and 20 to rest along the arcuate surface of the ball. At the outer ends of the segments 19 and 20, loops 21 and 22 are formed, the loops in unstressed condition being positioned near parallelism but converging slightly on the side thereof opposite the segments 19 and 20 so that when the ball is slipped between the loops, the loops will be spread slightly to come into parallelism as shown in Fig. 4 and thereby exert a gripping action on the ball. The eyelet 18 and the segments 19 and 20 together extend a distance substantially less than the diameter of the ball, and the loops 21 and 22 are of such diameter as to receive a segment of the ball in the manner shown in Figs. 4 and 5. It will be seen that in this embodiment the ball may be rotated within the frame to bring the different colored surfaces uppermost as the float rests on the surface of the water.

Figs. 1 through 6 show a simple eyelet for the purpose of fastening the float to the fish line, but it will be understood that any of the well known structures may be formed at this point in the frame for attaching the line. One such structure is shown in Fig. 7 wherein one end of the wire forming the loops is coiled about the other end of the wire as indicated at 23, the end opposite the end 23 having a plurality of coils as shown at 24 in close proximity to each other so that the fish line indicated at 25 may be threaded between the coils by rotation of the float to cause the line to enter between the extreme end of the wire and pass between the coils as the float is rotated.

The present invention provides an extremely light and buoyant float inasmuch as the shell of the ball may be of minimum thickness due to its spherical shape and may be filled with a buoyant gas. Furthermore, by employing a fine, very stiff wire, the frame may be made with a minimum of weight so that the composite structure is extremely buoyant. A further advantage is that the float becomes in effect reversible enabling the user to employ either color upwardly inasmuch as many fishermen prefer to use different colored floats for day and night fishing. Another advantage lies in the fact that the ball may be easily replaced if damaged or broken. This has particular advantage with that size of float utilizing a standard table tennis ball, since such balls are easily obtainable for replacement.

I claim:

1. A fishing float comprising a body buoyant in water, a frame of light gauge spring wire comprising two loops disposed in approximately parallel spaced relationship to bear against opposed areas of said body and retain the same therebetween and means disposed along one side of the body for connecting the loops and biasing the same into clamping engagement with the body and means for attaching a fishing line to the frame.

2. A fishing float for fishing lines comprising a ball buoyant in water and having a smooth hard outer surface, a frame of light gauge spring wire comprising two interconnected loops of smaller diameter than the diameter of the ball for the reception of the ball therebetween to project in part through the loops, the loops being connected together at a single point on each loop, the remaining portions of the loop being biased to bear against the ball to retain the same therebetween by spring compression, and means on the frame for attaching a fishing line.

3. A fishing float for fishing lines comprising a ball buoyant in water and having a smooth outer surface, a frame of light gauge spring wire comprising two loops interconnected at a common point, the planes of the loops diverging from said point in the form of a V for the reception of the ball therebetween to project in part through the loops, the loops being biased from said common point to bear against the body to retain the same therebetween by the force of said springs and means at said common point for attaching a fishing line.

4. A fishing float for fishing lines comprising a ball buoyant in water having a smooth hard outer surface and hemispherical portions of different colors, a frame of light gauge spring wire comprising two loops of smaller diameter than the diameter of the ball for reception of the ball therebetween, the loops being interconnected and biased to bear against opposite areas of the ball to normally retain the same in fixed position therebetween, the ball being manually rotatable in the frame to select the position of the colored portions and means for attaching the frame to a fishing line.

5. The combination of claim 2 wherein the ball comprises a hard and imperforate and water-impervious spherical shell filled with a gas having a density less than that of air.

6. The combination of claim 2 wherein the body comprises a table tennis ball.

References Cited in the file of this patent

UNITED STATES PATENTS

| | | |
|---|---|---|
| 169,419 | Clark | Nov. 2, 1875 |
| 631,197 | Bourke | Aug. 15, 1899 |
| 1,117,131 | Green | Nov. 10, 1914 |
| 1,986,441 | Koepke | Jan. 1, 1935 |
| 2,049,789 | Webster | Aug. 4, 1936 |
| 2,074,180 | Hatley | Mar. 16, 1937 |
| 2,231,270 | Huston | Feb. 11, 1941 |
| 2,239,813 | Dubell | Apr. 29, 1941 |
| 2,563,560 | Stafford | Aug. 7, 1951 |
| 2,598,360 | Cummins | May 27, 1952 |
| 2,636,305 | Shoenfelt | Apr. 28, 1953 |